Patented Nov. 1, 1938

2,135,031

UNITED STATES PATENT OFFICE 2,135,031

PROCESS FOR THE MANUFACTURE OF A THERAPEUTIC ORGANIC COMPOUND

Herman Elisha Brown, New Brunswick, N. J.

No Drawing. Application October 9, 1934,
Serial No. 747,531

4 Claims. (Cl. 167—68)

The object of my invention is to produce a stable, ferrous salt of a digestible nature, together with proteinized iodine compounds, as set forth in detail below.

What I claim as new is a water soluble combination of ferrous salts in which the acid radical is an easily digestible compound and of a nature which is non-constipating, a factor lacking in most therapeutic compounds of iron, generally used to produce tonic effects in humans.

In addition to the special kind of ferrous organic salts, the solution also contains proteinized iodine compounds with iodides, oxygenated compounds of iodine and free iodine. The proteins are easily digestible and when taken orally, act as buffers to the usual toxic effects produced by corresponding strengths of inorganic salts of iodine and free iodine.

The iodides are present in sufficient amount to maintain the iron salts in the ferrous state. This combination of iodine compounds enhances the tonic effects of the iron compounds and also has a slightly aperient action on vertebrates when taken orally even in moderate doses.

In the manufacture of my new therapeutic organic compound I proceed as follows: A cheap iron salt known as copperas or ferrous sulfate is the starting point for the ferrous malate. The ferrous sulfate is placed in solution in concentrated form and the ferrous salts are precipitated as hydrated carbonates by the use of a concentrated solution of soda ash. These are washed free from the by-products such as sodium sulfate and other contaminating salts by any well known method. These freshly precipitated hydrated ferrous carbonates containing a known amount of iron mostly in the ferrous state are then treated with a concentrated solution of malic acid in such proportions that there are present one equivalent of iron in the ferrous state to two equivalents of malic acid. Immediately thereafter a small amount of sodium iodide is added and the ferrous malate brought to a slightly acid condition by the addition of a small amount of malic acid.

I have found that when there is present in the finished solutions from 30–35% of ferrous malate, that in the same solution $\frac{1}{10}$–$\frac{1}{15}$% of sodium iodide inhibits the formation of ferric salts and maintains the ferrous malate in this condition even when exposed to sunlight and atmospheric oxygen. To this compound of ferrous malate protected by sodium iodide I add what is known as "oritone" so that the finished product will have from 12–20% of oritone. The ferrous malate so produced is partly in the precipitated state and partly in the liquid condition. The ferrous malate upon addition of sufficient quantity of water becomes soluble.

Oritone is a proteinized iodine salt, the proteins being present one-half in the form of vegetable proteins and one-half in the form of animal proteins. In a 5% solution of oritone there is approximately a total of from 1–1½% of proteins. The proteins are first dissolved and made alkaline with caustic soda solution. The amount of caustic soda used is in the form of sodium hydroxide approximately equal to the percentage of proteins. To this is then added iodine, either crude or resublimed, in the cold state, and agitation of the mixture is maintained until all of the iodine has passed into solution. The iodine is present in the form of oxidized iodine compounds, sodium iodide and proteinized iodine compound with approximately 1¼% iodine in what is known as the free condition.

As the finished product of this specific process, therefore, I have approximately the following percentages: 30–35% ferrous malate; $\frac{1}{10}$–$\frac{1}{15}$% of sodium iodide and the various compounds of iodine in the form of oritone to the extent of 15–20%.

It will be understood of course that the foregoing method of manufacture is given by way of example only and that the invention is in no wise limited thereto but covers all such modifications thereof as may fall within the scope of the appended claims.

The proportions of ferrous organic compounds and proteinized iodine compounds may vary due to the purpose for which the material is to be used—that is the organic salts of ferrous iron may preponderate in the mixture or the compounds of iodine. The limit for either one of these compounds is approximately 45% for ferrous salts with ½ of 1% of total iodine compounds or 15% for the iodine compounds with ½ of 1% of the ferrous salts. As an illustration but not intended as limits of practicability, 6% ferrous malate makes clear stable solutions with a mixture of iodized vegetable and animal proteins, sodium iodide and MIO where M represents a monatomic base (either inorganic or organic), and free iodine, in which the total iodine of the mixture is approximately 5%.

I claim:

1. The method of manufacturing a pharmaceutical iron compound which comprises reacting ferrous carbonate with malic acid, reacting the same with an iodine compound and thereafter adding a proteinized iodine salt.

2. In the manufacture of a pharmaceutical iron compound the step which consists in stabilizing ferrous malate with a compound of iodine.

3. In the manufacture of a pharmaceutical iron compound the step which consists in stabilizing ferrous malate with an iodine salt.

4. The method of producing a pharmaceutical iron compound which consists in treating ferrous carbonate with malic acid to produce ferrous malate, then treating the solution of ferrous malate with sodium iodide in an amount not exceeding 3% of the ferrous malate present in the solution, and thereafter adding to said solution a proteinized iodine salt.

HERMAN ELISHA BROWN.